United States Patent
Fore

Patent Number: 5,143,022
Date of Patent: Sep. 1, 1992

[54] DEER FEEDER

[76] Inventor: John C. Fore, 33203 Hwy. 10-19, Denham Springs, La. 70726

[21] Appl. No.: 770,427

[22] Filed: Oct. 4, 1991

[51] Int. Cl.$^5$ ............................................. A01K 51/03
[52] U.S. Cl. ................................................. 119/51.03
[58] Field of Search ................... 119/51.01, 51.03, 54, 119/18; 401/209; 348/317

[56] References Cited

U.S. PATENT DOCUMENTS

| | | | |
|---|---|---|---|
| 2,968,826 | 1/1961 | Leshin | 401/209 X |
| 2,972,334 | 2/1961 | Braden | 119/51.01 |
| 3,320,929 | 5/1967 | Kay | 119/18 |
| 3,946,703 | 3/1976 | Wheat | 119/51.03 X |
| 4,233,941 | 11/1980 | Webster | 119/52.2 |
| 4,940,350 | 7/1990 | Kim | 401/209 |
| 5,051,017 | 9/1991 | Yorks | 401/209 |

FOREIGN PATENT DOCUMENTS

| | | | |
|---|---|---|---|
| 1309151 | 3/1973 | United Kingdom | 119/51.03 |
| 2082124 | 3/1982 | United Kingdom | 401/209 |

*Primary Examiner*—Gene Mancene
*Assistant Examiner*—Thomas Price
*Attorney, Agent, or Firm*—Reginald F. Roberts, Jr.

[57] ABSTRACT

A device for feeding deer, antelope, and other animals by releasing a liquid feedstock such as molasses whenever part of the device is licked by the animal.

3 Claims, 2 Drawing Sheets

DEER FEEDER

BACKGROUND OF THE INVENTION

The present invention relates to the feeding of livestock. More particularly, the present invention relates to a deer feeder.

There are many prior-art feeders on the market which dispense feed automatically. These range from units that rely on the wind to dispense the feed to very large units which dispense variable amounts of feed at almost any time of the day or night. However, none of these feeders is designed for or is capable of dispensing feed solely in response to the licking action of a deer or other animal. The present invention provides such a device and method.

SUMMARY OF THE INVENTION

In general, the present invention provides a device and a method for the feeding of deer and other livestock in response to the licking action of the livestock.

In one aspect, then, the present invention provides a method for feeding deer and other livestock by providing a device which dispenses feed in response to licking of the device by the livestock, and exposing the device to the livestock.

In a second aspect, the invention provides a device which is constructed and arranged to release a liquid feedstock whenever the device is licked by a deer or other animal.

In a third aspect, the invention provides a method for feeding deer and other livestock which comprises the following steps:
  (a) Providing a container for a liquid feedstock. The container has a neck with a first set of threads on the exterior surface thereof.
  (b) At least partially filling the container with the feedstock.
  (c) Providing a ball retainer having a neck with a second set of threads on the interior surface thereof. The second set of threads are constructed and arranged to engage the first set of threads on the exterior surface of the neck of the container. The ball retainer has an indented shoulder and a retaining lip.
  (d) Disposing within the ball retainer a ball constructed and arranged to be rotatably retained between the indented shoulder and the retaining lip of the ball retainer, and to dispense the liquid feedstock as the ball is rotated.
  (e) Attaching the ball retainer to the neck of the container by engaging the first and second sets of threads.
  (f) Inverting the container to bring the liquid feedstock into contact with the ball.
  (g) Suspending the inverted container at a height where the ball can be liked by the livestock.

The liquid feedstock is released in response to the rotation of the ball as the ball is licked by the livestock.

In a fourth aspect the invention provides a device for feeding deer and other livestock. The device comprises a container having a neck with a first set of threads on the exterior surface thereof, and means for suspending the container in an inverted position. The device further comprises a ball retainer having a neck with a second set of threads on the interior surface thereof. The second set of threads are constructed and arranged to engage the first set of threads on the exterior surface of the neck of the container. The ball retainer has an indented shoulder and a retaining lip. A ball is rotatably disposed within the ball retainer. The ball is constructed and arranged to be retained between the indented shoulder and the retaining lip of the ball retainer. The device is used to feed deer and other livestock by: at least partially filling the container with a liquid feedstock, attaching the ball retainer to the neck of the container by engaging the first and second sets of threads, inverting the container to bring the liquid feedstock into contact with the ball, and suspending the container in an inverted position at a height where the ball can be licked by the livestock. The deer and other livestock are fed by the release of the liquid feedstock in response to the rotation of the ball as the ball is licked by the livestock.

As used herein, the term "ball" is defined as any substantially round, smooth object. The term "livestock" is defined as any kind of animal, wild or domesticated, which is fed by people. Examples of livestock for which the present invention is particularly well-suited include deer and antelope.

DETAILED DESCRIPTION OF THE INVENTION

Figure 1:
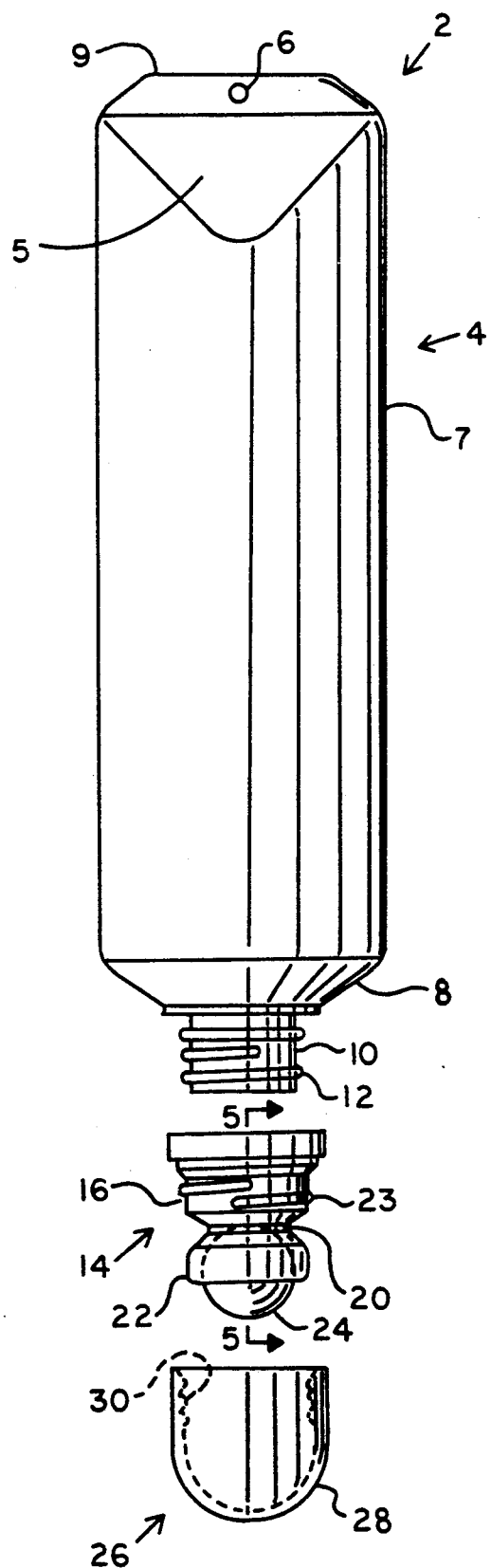
FIG. 1 is a frontal exploded view of a deer feeder made in accordance with the principles of the present invention.
Figure 2:
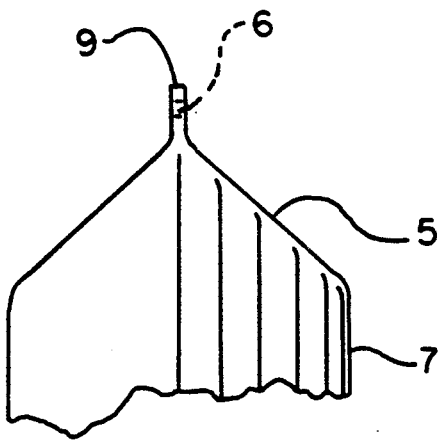
FIG. 2 is a fragmentary side view of the deer feeder shown in FIG. 1.
Figure 5:
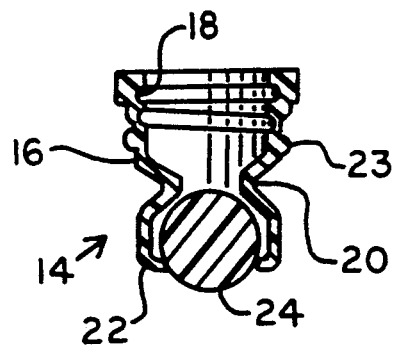
FIG. 5 is a cross-sectional view of part of the deer feeder shown in FIG. 1, taken along the cutting line 5—5.

More specifically, reference is made to FIGS. 1–4, which show a deer feeder, generally designated by the numeral 2, made in accordance with the principles of the present invention.

The deer feeder 2 comprises a container 4 suitable for holding a liquid feedstock for deer and similar animals. The container has a triangular bottom part 5 defining a vertex terminating in a vertical plate 9 extending outward from the vertex in a plane which substantially bisects the triangular bottom part 5. The means for suspending the container 4 include an opening 6 near the center of the vertical plate 9, for engaging a hook, chain, or rope whereby the container 4 can be suspended in an inverted position from a frame, a stand, a post, a tree, or other support (not shown) by connecting the hook, chain, rope, or other suspension means to the support.

The container 4 has a body 7 which tapers through a shoulder 8 to a narrow neck 10. The neck 10 has on its external surface a first set of threads 12.

The feeder 2 further comprises a ball retainer 14 having a neck 16 on the internal surface of which are a second set of threads 18 constructed and arranged to engage the first set of threads 12, whereby the ball retainer 14 can beneficially be attached to the neck 10 of the container 4 by mutually engaging the first and second sets of threads 12 and 18, respectively. By turning the ball retainer 14 in engagement with the container 4, the ball retainer 14 is firmly attached to the container 4.

The neck 16 of the ball retainer 14 has on its external surface a third set of threads 23, the purpose of which will be made clear hereinbelow.

The ball retainer 14 further comprises an indented shoulder 20 and retaining lip 22 whereby a ball 24 is rotatably held between the shoulder 20 and the lip 22.

Figure 4:
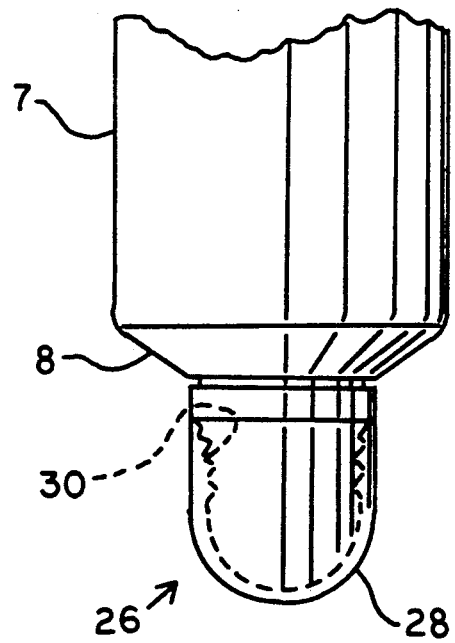
FIG. 4 is a fragmentary frontal view of the deer feeder shown in FIG. 1.

When not in use, the container 4 and ball retainer 14 are beneficially closed as shown in FIG. 4 by a cap 26 having a closed end 28 and an open end 29, and having on its interior surface near its open end 29 a fourth set of threads 30. The fourth set of threads 30 are constructed and arranged to engage the third set of threads 23 on the outer surface of the neck 16 of the ball retainer 14. Closure is accomplished by mutually engaging the third and fourth sets of threads 23 and 30, and turning the cap 26 while holding the container 4 and ball retainer 14 stationary.

Figure 3:
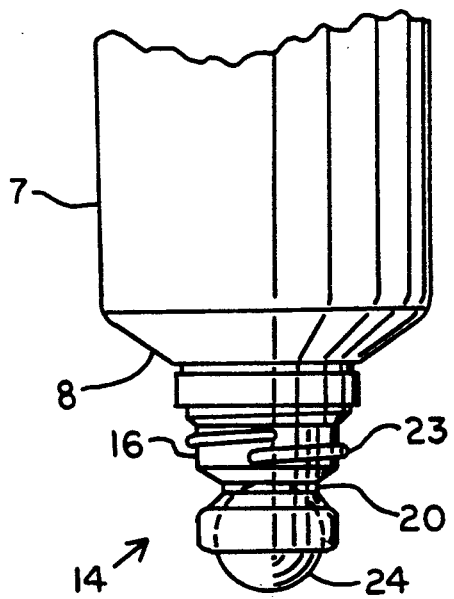
FIG. 3 is a fragmentary frontal view of the deer feeder shown in FIG. 1.

The device 2 is used to feed deer and other livestock by at least partially filling the container 4 with a liquid feedstock such as molasses, attaching the ball retainer 14 and ball 24 to the neck 10 of the container 4 as shown in FIG. 3, inverting the container 4 to bring the liquid feedstock into contact with the ball 24, and suspending the deer feeder 2 in an inverted position at a height where the ball 24 can be licked by the livestock. The deer and other livestock are fed by the release of the liquid feedstock in response to the rotation of the ball 24 as the ball is licked by the livestock.

I claim:

1. A method for feeding deer and other livestock, the method comprising the steps of:
   (a) providing a container for a liquid feedstock, the container having a neck with a first set of threads on the exterior surface thereof;
   (b) at least partially filling the container with the feedstock;
   (c) providing a ball retainer having ($c_1$) a neck with a second set of threads on the interior surface thereof constructed and arranged to engage the first set of threads on the exterior surface of the neck of the container, ($c_2$) an indented shoulder, and ($c_3$) a retaining lip;
   (d) disposing within the ball retainer a ball constructed and arranged to be rotatably retained between the indented shoulder and the retaining lip of the ball retainer and to dispense the liquid feedstock as the ball is rotated;
   (e) attaching the ball retainer to the neck of the container by engaging the first and second sets of threads;
   (f) inverting the container to bring the liquid feedstock into contact with the ball; and
   (g) suspending the inverted container at a height where the ball can be licked by the livestock;
thereby providing a method for feeding the deer and other livestock by releasing the liquid feedstock in response to the rotation of the ball as the ball is licked by the livestock.

2. A device for feeding deer and other livestock, the device comprising:
   (a) a container having a heck with a first set of threads on the exterior surface thereof, and means for suspending the container in an inverted position;
   (b) a ball retainer having a neck with a second set of threads on the interior surface thereof constructed and arranged to engage the first set of threads on the exterior surface of the neck of the container, an indented shoulder, and a retaining lip; and
   (c) a ball rotatably disposed within the ball retainer, the ball constructed and arranged to be retained between the indented shoulder and the retaining lip of the ball retainer;
thereby providing a device for feeding deer and other livestock by
   (d) at least partially filling the container with a liquid feedstock,
   (e) attaching the ball retainer to the neck of the container by engaging the first and second sets of threads,
   (f) inverting the container to bring the liquid feedstock into contact with the ball, and
   (g) suspending the container in an inverted position at a height where the ball can be licked by the livestock, thereby feeding the deer and other livestock by releasing the liquid feedstock in response to the rotation of the ball as the ball is licked by the livestock;
wherein
   (h) the container has an oblique triangular bottom part defining a vertex terminating in a vertical rectangular plate extending outwardly from the vertex in a plane which substantially bisects the triangular bottom part, and
   (i) the means for suspending the container include an opening near the center of the vertical plate, for engaging a hook, chain, or rope.

3. A device for feeding deer and other livestock, the device comprising;
   (a) a container having a neck with a first set of threads on the exterior surface thereof, and means for suspending the container in an inverted position:
   (b) a ball retainer having a neck with a second set of threads on the interior surface thereof constructed and arranged to engage the first set of threads on the exterior surface of the neck of the container, an indented shoulder, and a retaining lip; and
   (c) a ball rotatably disposed within the ball retainer, the ball constructed and arranged to be retained between the indented shoulder and the retaining lip of the ball retainer; thereby providing a device for feeding deer and other livestock by
   (d) at least partially filling the container with a liquid feedstock,
   (e) attaching the ball retainer to the neck of the container by engaging the first and second sets of threads,
   (f) inverting the container to bring the liquid feedstock into contact with the ball, and
   (g) suspending the container in an inverted position at a height where the ball can be licked by the livestock, thereby feeding the deer and other livestock by releasing the liquid feedstock in response to the rotation of the ball as the ball is licked by the livestock,
   (h) the container has an oblique triangular bottom part defining a vertex terminating in a vertical rectangular plate extending outwardly from the vertex in a plane which substantially bisects the triangular bottom part, and
   (i) the means for suspending the container include an opening near the center of the vertical plate, for engaging a hook, chain, or rope.

* * * * *